United States Patent [19]

Yuill

[11] Patent Number: 4,510,791

[45] Date of Patent: Apr. 16, 1985

[54] METHOD AND APPARATUS FOR TESTING THE AIR-TIGHTNESS OF A BUILDING USING TRANSIENT PRESSURIZATION

[75] Inventor: Grenville K. Yuill, Winnipeg, Canada

[73] Assignee: Lion Industries Ltd., Winnipeg, Canada

[21] Appl. No.: 610,036

[22] Filed: May 14, 1984

Related U.S. Application Data

[63] Continuation-in-part of Ser. No. 414,449, Sep. 2, 1982, abandoned.

[30] Foreign Application Priority Data

Sep. 3, 1981 [GB] United Kingdom ................. 8126658

[51] Int. Cl.³ ............................................. G01M 3/26
[52] U.S. Cl. .......................................... 73/40; 73/49.4
[58] Field of Search ......................... 73/40, 49.2, 49.4

[56] References Cited

U.S. PATENT DOCUMENTS 3,893,332  7/1975  Dolan et al. ............................ 73/40
3,918,291  11/1975  Pauly et al. ............................ 73/40
4,363,236  12/1982  Meyers .................................. 73/40

OTHER PUBLICATIONS

Blomsterberg, A. K., et al., *Approaches to Evaluation of Air Infiltration Energy Losses in Buildings.* In ASHRAE Transactions. vol. 85, Part 1. 1979.

*Primary Examiner*—Stephen A. Kreitman
*Assistant Examiner*—Joseph W. Roskos
*Attorney, Agent, or Firm*—Stanley G. Ade

[57] ABSTRACT

A method and apparatus for testing the air-tightness of an enclosure such as a house or building, includes the increasing of the pressure within the enclosure relatively rapidly to above a predetermined amount with all doors and windows being closed and then measuring the leakage of decay of the increased pressure together with the time in order to arrive at a leakage coefficient of the enclosure. The increase in pressure should be high enough above atmospheric pressure to allow accurate pressure measurement, but not high enough to damage the structure.

16 Claims, 2 Drawing Figures

METHOD AND APPARATUS FOR TESTING THE AIR-TIGHTNESS OF A BUILDING USING TRANSIENT PRESSURIZATION

BACKGROUND OF THE INVENTION

This invention relates to new and useful improvements in methods, apparatus and procedures for testing the air-tightness of a building and is a continuation-in-part application Ser. No. 414,449 filed Sept. 2, 1982, now abandoned.

One of the ways of improving the cost of heating an existing building such as a house or the like is to reduce leakage which normally occurs through window frames, door frames and other vents or cracks normally present in a building.

However, it is difficult with present techniques to assess the efficiency of sealing procedures which may have been undertaken.

Present techniques, as illustrated in the background of the art shown, for example, in U.S. Pat No. 3,893,332 (Dolan), U.S. Pat. No. 4,363,236 (Meyers) and U.S. Pat. No. 3,918,291 (Pauly) and in addition in a paper presented by Blomsterberg appearing in Ashrae transactions 1979, volume 85, part 1, all involve creating a steady state and then measuring the volume of air introduced to maintain the steady state. These techniques have very many problems as explained in detail in the above documents relating to changes in temperature, changes of volume in the structure and in the vessel which supplies the pressurized gas. In all these cases the attempt is to maintain or achieve a steady state but, of course, slight variations from the steady state will occur since it is very difficult to set up the steady state.

These techniques are available but generally involve very expensive and complex equipment and hence the use and effectiveness of these techniques has been limited.

SUMMARY OF THE INVENTION

In contrast to the above techniques, the present invention provides a surprisingly different arrangement in which a pressure pulse is created of short duration. The pressure pulse is created by rapidly introducing gas into the structure at a rapid rate and for a short period of time so the pulse has a profile which rapidly rises from an ambient pressure within the structure to a peak and then declines back to the ambient pressure without at any time reaching a steady state.

The term rapid rate as mentioned above is intended to include any rate which is sufficiently greater than the steady state rate, that the pressure within the structure rises rapidly from the ambient pressure to a pressure considerably higher than the ambient pressure. In the prior art techniques the pressure, of course, must increase at some times in order to provide the slightly increased pressure which is used in steady state but this is very different from the rapid rate in which the gas of the present invention is introduced.

The short period of time mentioned above is intended to include any situation where the injection or introduction of gas is halted or controlled prior to achievement of a steady state or damage to the building. Firstly it will be appreciated that the above expressions define the creation of a pressure pulse as opposed to the conventional techniques wherein a steady state is created.

In order to obtain information concerning the air-tightness of the structure, information concerning the profile of the pulse is obtained which can then be used in calculations to develop a factor for air-tightness of the structure concerned.

The information detected can relate to two separate points on the profile and the time between those points. In an alternative arrangement the information can relate to the value of the peak of the pulse which can be combined with a value for the pressure within the vessel from which the gas is released prior to the release in a yet further calculation.

With the foregoing in view, and other advantages as will become apparent to those skilled in the art to which this inventiuon relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
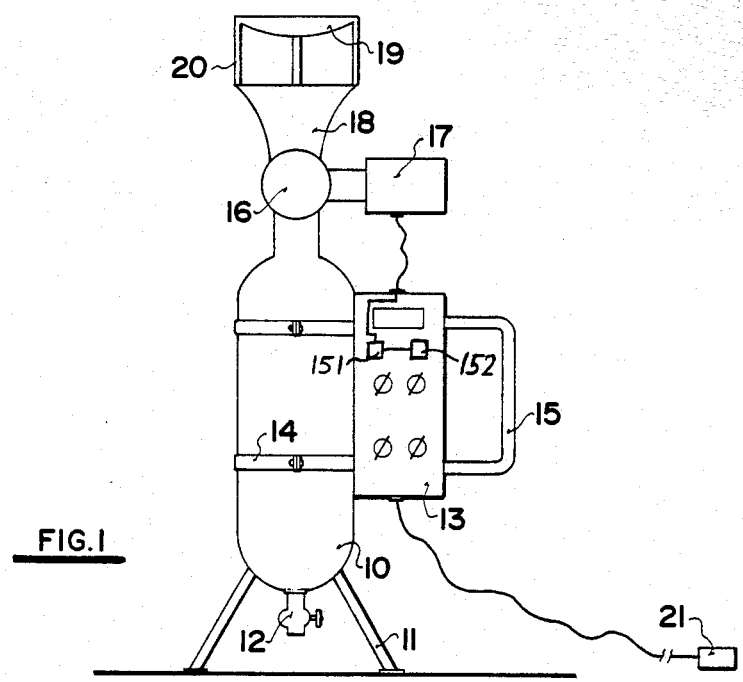
FIG. 1 is a schematic view of apparatus which may be used to practice the invention.

Proceeding therefore to describe the invention in detail, one device to carry out this test may consist of a pressure tank with a quick-opening valve which will release compressed air or other gas into the building together with a pressure sensing apparatus which will detect and time the rise and/or fall in pressure after the compressed air or gas is released.

The compressed air or gas may be sealed in a tank by a relatively large diameter fast acting valve held in the normally closed position by a spring. The valve may be actuated by compressed air from the cylinder, released through a manual valve in a small air line, which the operator will open instantly, or it may be actuated electrically. When the house pressure reaches an upper limit, it will be sensed by a pressure transducer which will shut off the compressed air to the valve actuator and the spring will drive the valve closed.

At this point, the house pressure will begin to fall and the fall past, for example, 200 Pa will operate an electronic timer and fall past, for example, 20 Pa, will stop the timer. The elapsed time will therefore be a measure of the leakiness of the house.

A further method is based on the assumption that the flow rate from the tank will be a function only of the remaining tank pressure. Therefore, it will vary with time in the same way, every time a test is run. In this second method, the valve would be driven open at a certain time and would stay open. The house pressure would rise, and then fall again as the compressed air or gas was depleted from the tank. The time from the instant when the house pressure reached, for example, 20 Pa until it fell again to 20 Pa would be a direct measure of the leakiness of the house. These pressure measurements are, of course, measurement above ambient pressure.

As an example of the first method, the principles of which would be applicable to the second method, the volume of a typical house might be 510 $M^3$(18000 $ft^3$).

The pressure will be at 101 kPa (14.7 psi). The pressure tank may contain approximately 2.25 M$^3$ (80 ft$^3$) of air or gas (as measured at a standard temperature and pressure) and at a pressure which can be as high as 21 MPa (3000 psi) or less depending on the size of the tank used.

This amount of air would be sufficient to pressurize a house to 450 Pa (0.065 psi) above atmospheric pressure, but it will be appreciated that it will be necessary to assure that the overpressure was not high enough to damage the house. 300 Pa is generally considered a safe pressure.

A well constructed house will leak at a rate of from 1 to 4 air changes per hour at 50 Pa. This is equivalent to from 0.014 to 0.70 M$^3$ per second (5 to 25 ft$^3$ per second).

Based on these leakage rates, the fall in pressure from 200 Pa (an appropriate trigger point at which to start an electronic timer) down to 20 Pa, the lowest pressure at which accurate readings can be taken, would be from 1 to 4 seconds and this kind of pressure transient can easily be measured by a conventional electronic timer with two pressure transducers.

This enables the leakage rates to be ascertained and appropriate action taken if desired.

The preferred embodiment is the portable tank method described and is probably the most efficient and practical although other methods can, of course, be used.

In FIG. 1, the preferred embodiment of the apparatus is shown in which the pressure tank 10 is supported upon legs 11 and is provided with a fill valve 12 on the underside thereof. An electronic package 13 is secured to the tank by mounting straps 14 and a carrying handle 15 extends from the package as shown.

A conventional fast acting valve 16 is situated upon the upper end of the tank and controlled by a valve controller 17 operatively connected to a timer schematically indicated at 151 in the electronics package, and a bell shaped nozzle or other type orifice 18 extends from the valve 16 for the ejection of the gas against the convex surface 19 of a deflector held in a spaced above relationship to the nozzle by means of legs 20.

The electronics package 13 includes a pressure sensor 152 which detects pressure values as explained previously, either in the decline portion of the pulse or at the commencement of the pulse and then at the end of the pulse, as also explained before. The pressure sensor 152 is connected also to the timer 151 so that the time between the points on the pulse can be measured.

The fast acting valve acts as a rapid release valve so as to rapidly release the gas so that the pressure within the building or structure rapidly increases. Thus the gas is introduced at a rate which is considerably in excess of any leakage. After a time period controlled by the timer 151, the valve 16 is closed to halt the release of the gas prior to sufficient excess pressure being developed within the structure which can cause damage to the structure. After the release of gas has rapidly increased the pressure, the pressure then decays due to leakage so that at no time is a steady state reached or more specifically, the rate of feed of air is not controlled in order to obtain a steady state.

If desired, an outdoor pressure transducer 21 may be operatively connected to the electronics package.

Figure 2:
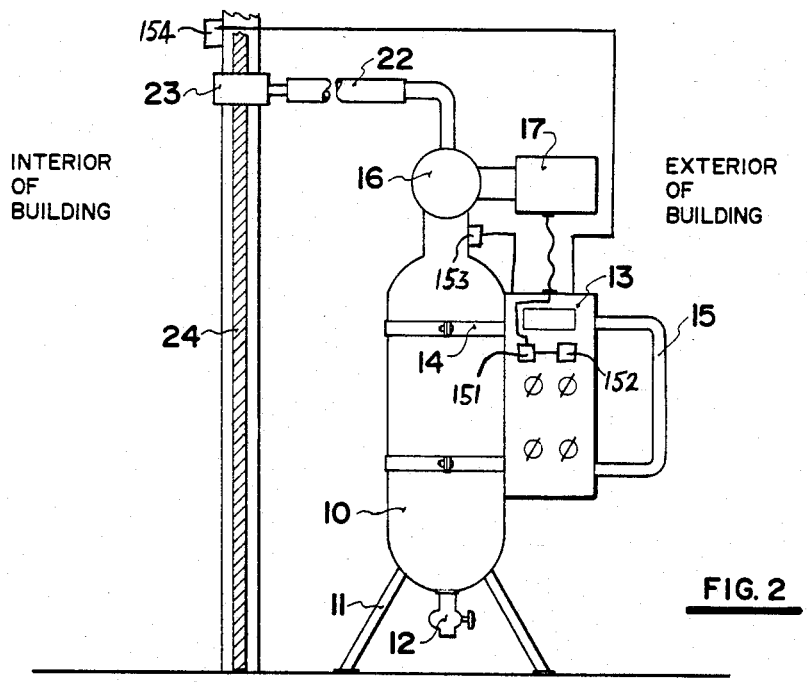
FIG. 2 is a schematic view of an apparatus in use externally of a building and operatively connected thereto.

Alternatively, a source of gas under pressure may be contained within a tank such as tank 10 and operatively connected to the interior of the house or building by means of a line or conduit 22 detachably connected to a valve 23 extending through a door 24 or the like, it being understood that the tank is situated externally of the building as shown schematically in FIG. 2. The electronics package 13, the valve controller 17 and the fast acting valve 16 will, of course, be similar to those shown in FIG. 1.

The apparatus of FIG. 2 is also modified by the addition of a pressure sensor 153 which is schematically illustrated and is attached to the vessel 10 and communicates the pressure sensed in the vessel to the electronics package 13.

This arrangement can be used in a modified technique in which the pressure pulse is created as previously explained, with the sensor 152 responsive to the pressure in the interior of the building as indicated by a pressure gauge schematically indicated at 154. In this technique, however, the parameters required for the calculation of the air-tightness of the house are obtained firstly by a measurement of the pressure within the vessel 10 immediately prior to the release of gas into the interior of the building and also the value of the peak pressure in the interior of the building as sensed by the sensor 154. From these two parameters the air-tightness of the building can be calculated. Calculation factors can be obtained empirically by simple tests using the specific apparatus concerned to calibrate the apparatus.

The sensor 152 can either be arranged to sense specific points on the profile of the curve as previously explained, or can be arranged to develop an actual profile by sensing the varying pressure in the pulse as sensed by the detector 154.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method for use in the determination of the air-tightness of a structure comprising introducing into the structure gas at a rapid rate and for a short period of time so as to create in the air pressure within the structure a pressure pulse defining a profile which rapidly rises from an ambient pressure within the structure to a peak and then declines back to the ambient pressure without reaching a steady state, and detecting information concerning the profile of the pulse.

2. The method according to claim 1 in which the peak pressure is not in excess of 450 Pa.

3. The method according to claim 1 wherein the gas is introduced by the release of gas from a vessel containing pressurized gas.

4. A method according to claim 1 wherein the step of detecting information concerning the profile of the pulse comprises detecting at least two different points on the profile and measuring the time interval between the points.

5. The method according to claim 4 wherein both of the points are arranged on a portion of the profile subsequent to the peak.

6. A method according to claim 4 wherein one of the points is prior to the peak and one of the points is subsequent to the peak and wherein a predetermined volume of gas is introduced into the structure.

7. A method for use in the determination of the air-tightness of a structure comprising releasing gas from a vessel of pressurized gas into the structure at a rapid rate and for a short period of time so as to create in the air pressure within the structure, a pressure pulse defining a profile which rapidly rises from an ambient pressure within the structure to a peak and then declines back to the ambient pressure without reaching a steady state, detecting information concerning the profile of the pulse and prior to release of the gas from the vessel detecting the pressure of the gas within the vessel.

8. The method according to claim 7 wherein the step of detecting information concerning the profile of the pulse includes detecting the peak value of the pulse.

9. The method according to claim 7 wherein the peak value of the pulse is not in excess of 450 Pa.

10. Apparatus for use in the determination of the air tightness of a structure comprising means for releasing gas into the structure, said releasing means including a rapid release valve and means for restricting the volume of air released whereby said releasing means can release into the structure at a rapid rate and for a short period of time so as to create in the air pressure within the structure, a pressure pulse defining a profile which rapidly rises from an ambient pressure within the structure to a peak and then declines back to the ambient pressure without reaching a steady state, and means for detecting information concerning the profile of the pulse.

11. Apparatus according to claim 10 wherein said releasing means comprises a vessel of pressurized gas.

12. Apparatus according to claim 10 including timer means for controlling actuation of said rapid release valve.

13. Apparatus according to claim 10 wherein said detecting means includes means to detect two points on said profile and means for timing the interval between said points.

14. Apparatus according to claim 10 wherein said release means comprises a vessel of pressurized gas and wherein there is provided means for detecting the pressure of the pressurized gas prior to release thereof into the structure.

15. Apparatus for use in the determination of the air-tightness of a structure comprising a vessel for pressurized gas, a rapid release valve for controlling release of the pressurized gas from said vessel, timer means for actuating said rapid release valve, means for introducing gas released from said vessel into the structure, said rapid release valve and timer means being arranged such that gas released into the structure creates in the air pressure within the structure a pressure pulse defining a profile which rapidly rises from an ambient pressure within the structure to a peak and then declines back to the ambient pressure without reaching a steady state, and means for detecting information concerning the profile of the pulse.

16. Apparatus for use in the determination of the air-tightness of a structure comprising a vessel for pressurized gas, a rapid release valve for controlling release of the pressurized gas from said vessel, timer means for actuating said rapid release valve, means for introducing gas released from said vessel into the structure, said rapid release valve and timer means being arranged such that gas released into the structure creates in the air pressure within the structure a pressure pulse defining a profile which rapidly rises from an ambient pressure within the structure to a peak and then declines back to the ambient pressure without reaching a steady state, means for detecting the pressure of the gas within the vessel prior to release thereof into the structure and means for detecting the peak value of the pulse.

* * * * *